US008539360B2

(12) United States Patent
Angell et al.

(10) Patent No.: US 8,539,360 B2
(45) Date of Patent: Sep. 17, 2013

(54) MANAGEMENT OF DATA ON RELATED WEBSITES

(75) Inventors: Robert Lee Angell, Salt Lake City, UT (US); Robert R. Friedlander, Southbury, CT (US); Richard Hennessy, Austin, TX (US); James R. Kraemer, Santa Fe, NM (US); William Philip Shaouy, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 12/423,554

(22) Filed: Apr. 14, 2009

(65) Prior Publication Data

US 2010/0262918 A1  Oct. 14, 2010

(51) Int. Cl.
*G06F 3/00* (2006.01)
*G06Q 99/00* (2006.01)

(52) U.S. Cl.
USPC .......................................... 715/751; 705/319

(58) Field of Classification Search
USPC ......... 705/319; 709/609, 620, 622; 715/239, 715/751, 760, 764, 809, 780
See application file for complete search history.

(56) References Cited

U.S. PATENT DOCUMENTS

| 6,229,534 | B1 | 5/2001 | Gerra et al. | |
|---|---|---|---|---|
| 6,288,717 | B1* | 9/2001 | Dunkle | 715/763 |
| 7,783,592 | B2* | 8/2010 | Armstrong et al. | 715/751 |
| 2002/0015057 | A1 | 2/2002 | Park | |
| 2006/0179111 | A1 | 8/2006 | Verona | |
| 2006/0200432 | A1* | 9/2006 | Flinn et al. | 706/12 |
| 2006/0200433 | A1* | 9/2006 | Flinn et al. | 706/12 |
| 2006/0200434 | A1* | 9/2006 | Flinn et al. | 706/12 |
| 2006/0200435 | A1* | 9/2006 | Flinn et al. | 706/12 |
| 2007/0156614 | A1* | 7/2007 | Flinn et al. | 706/12 |
| 2007/0174220 | A1* | 7/2007 | Flinn et al. | 706/12 |
| 2007/0282987 | A1 | 12/2007 | Fischer et al. | |
| 2008/0071796 | A1 | 3/2008 | Ghuneim et al. | |
| 2008/0208956 | A1 | 8/2008 | Spiridellis et al. | |
| 2008/0235592 | A1 | 9/2008 | Trauth | |
| 2008/0243607 | A1 | 10/2008 | Rohan et al. | |
| 2008/0250332 | A1* | 10/2008 | Farrell et al. | 715/753 |
| 2008/0294663 | A1* | 11/2008 | Heinley et al. | 707/100 |
| 2008/0306913 | A1 | 12/2008 | Newman et al. | |
| 2009/0144075 | A1* | 6/2009 | Flinn et al. | 705/1 |
| 2009/0327923 | A1* | 12/2009 | Walker et al. | 715/760 |
| 2010/0036934 | A1* | 2/2010 | Bruster | 709/219 |
| 2010/0161631 | A1* | 6/2010 | Yu et al. | 707/758 |
| 2010/0228777 | A1* | 9/2010 | Imig et al. | 707/772 |
| 2010/0274815 | A1* | 10/2010 | Vanasco | 707/798 |

OTHER PUBLICATIONS

John G. Breslin, Andreas Harth, Uldis Bojars, Stefan Decker. "Towards Semantically-Interlinked Online Communities." Jun. 30, 2005, The Semantic Web: Research and Applications. Second European Semantic Web Conference.*
K. Bajaj, "Stringent Data Protection Law to Help Maintain Lead in it Sector" Jan. 19, 2009, http://www.livemint.com/2009/01/18235959/Stringent-data-protection-law.html, pp. 1-3.

* cited by examiner

*Primary Examiner* — Rashawn Tillery
(74) *Attorney, Agent, or Firm* — John R. Pivnichny; Law Office of Jim Boice

(57) ABSTRACT

A computer-implemented method, system and computer program product of managing and sharing entries into a webpage are presented. The computer-implemented method receives an input to an input box located in a first webpage on a first network. This input is analyzed to determine its subject matter, and is then migrated into an appropriate subject box on the webpage. In one embodiment, the input is then shared with another webpage, for the same user, which is on a second network.

19 Claims, 4 Drawing Sheets

MANAGEMENT OF DATA ON RELATED WEBSITES

BACKGROUND OF THE INVENTION

1. Technical Field

The present disclosure relates to the field of computers, and specifically to websites on a network.

2. Description of the Related Art

Websites present a collection of webpages on the World Wide Web (WWW). Such webpages typically present text, video, audio, and multimedia content. Social websites are websites that are maintained by individual users to share common interests and activities with friends. These friends are users who maintain their own social websites on a same social network.

Typically, a main webpage from a social website includes sections for photos, web logs ("blogs"), personal messages, and other computer-based emulations of person-to-person contact. Each social network's service provider allows members on the same social network to view and make additions (e.g., short messages, "tagging" of photos, etc.) to a friend's webpage. However, these service providers do not permit "cross-talk" between social networks. For example, assume that a single user has a first webpage on a first social network and a second webpage on a second social network. The first webpage is not accessible to his friends who are on the second social network, and the second webpage is not accessible to his friends who are on the first social network. Therefore, if that user wants to put the same information on his first webpage and his second webpage, then he must enter this same information twice.

As noted above, the typical social webpage includes different sections for different elements, which may be segregated according to different ontologies. For example, a single social webpage may have a section for sports and exercise interests of the user, another section for cooking interests, another section for movie interests, etc. These sections may be boxes that include text and/or graphic (e.g., photos) and/or audio (e.g., MP3 files) content. If a user wants to share a new recipe, then he must be certain to enter this recipe into the section for "cooking interests." If the recipe is mistakenly entered into the section for "sports," then that entry is non-sensible and would likely be overlooked by friends browsing his webpage for new recipes.

BRIEF SUMMARY OF THE INVENTION

To address the above described issue, a computer-implemented method, system and computer program product of managing and sharing inputs into a webpage are presented. The computer-implemented method, which is executed on a specific processor, receives an input to an input box located in a first webpage on a first network. This input is analyzed to determine its subject matter, and is then migrated into an appropriate subject box on the webpage. In one embodiment, the input is then shared with another webpage, for the same user, which is on a second network.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE INVENTION

Figure 1:
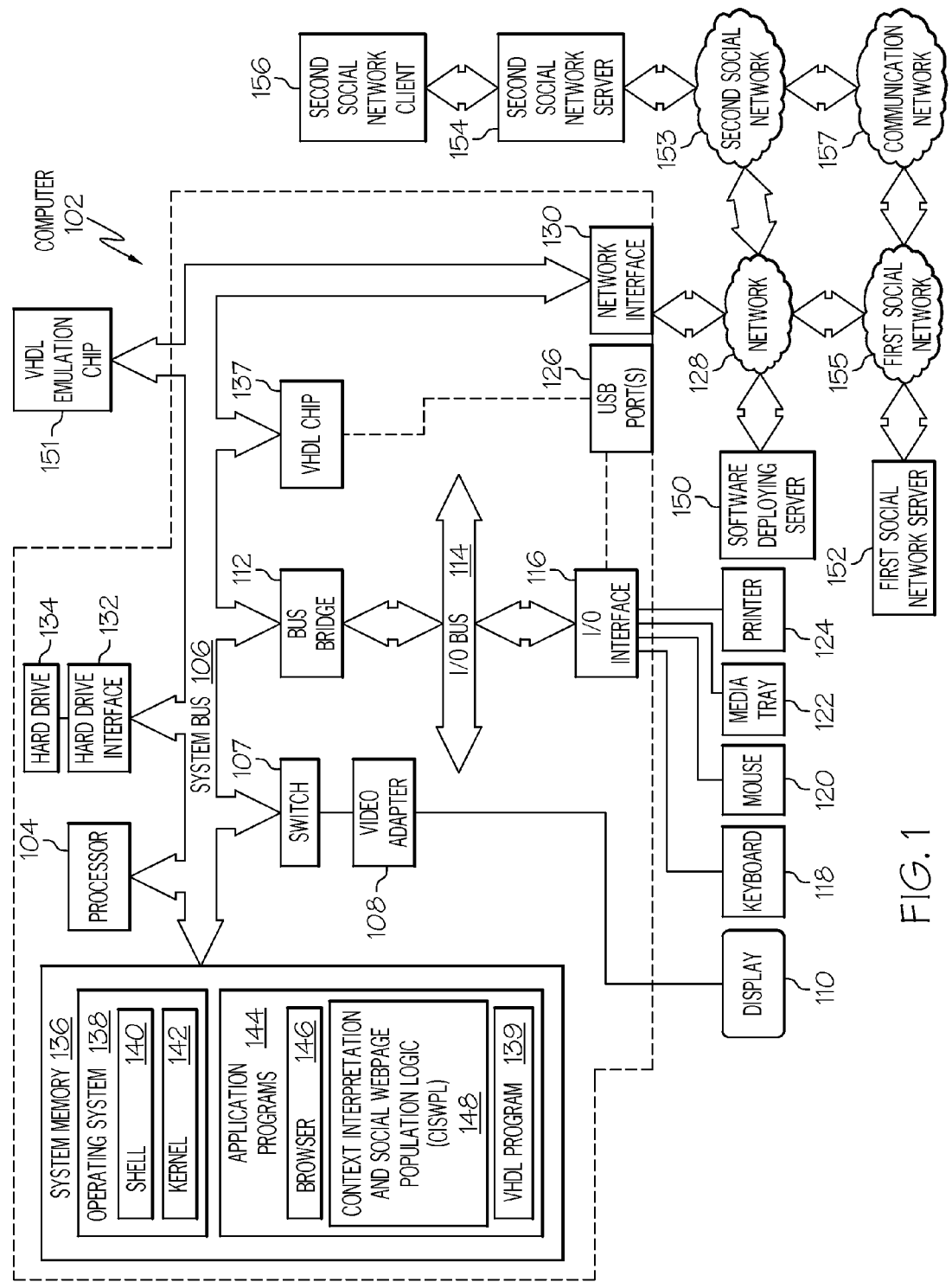
FIG. 1 depicts an exemplary computer in which the present invention may be implemented.

With reference now to the figures, and in particular to FIG. 1, there is depicted a block diagram of an exemplary computer 102, which may be utilized by the present invention as a first social network client. Note that some or all of the exemplary architecture shown for computer 102 may be utilized by software deploying server 150, first social network server 152, second social network server 154, and/or second social network client 156.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional, only upon execution of instructions (e.g., Context Interpretation and Social Webpage Population Logic—CISWPL 148 described below) that perform the method described herein.

System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), USB port(s) 126. While the format of the ports connected to I/O interface 116 may be any known to those skilled in the art of computer architecture, in a preferred embodiment some or all of these ports are Universal Serial Bus (USB) ports.

As depicted, computer 102 is able to communicate with a software deploying server 150, as well as a first social network server 152 and a second social network server 154 via their respective first social network 155 and second social network 153. Communication between the computer 102 and network 128 is via a network interface 130. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Context Interpretation and Social Webpage Population Logic (CISWPL) 148. CISWPL 148 includes code for implementing the processes described below, including those described in FIGS. 2a-3. In one embodiment, computer 102 is able to download CISWPL 148 from software deploying server 150, including in an on-demand basis. Note further that, in one embodiment of the present invention, software deploying server 150 performs all of the functions associated with the present invention (including execution of CISWPL 148), thus freeing computer 102 from having to use its own internal computing resources to execute CISWPL 148.

Also stored in system memory 136 is a VHDL (VHSIC Hardware Description Language) program 139. VHDL is an exemplary design-entry language for Field Programmable Gate Arrays (FPGAs), Application Specific Integrated Circuits (ASICs), and other similar electronic devices. In one embodiment, execution of instructions from CISWPL 148 causes VHDL program 139 to configure VHDL chip 137, which may be an FPGA, ASIC, etc.

In another embodiment of the present invention, execution of instructions from CISWPL 148 results in a utilization of VHDL program 139 to program a VHDL emulation chip 151. VHDL emulation chip 151 may incorporate a similar architecture as described above for VHDL chip 137. Once CISWPL 148 and VHDL program 139 program VHDL emulation chip 151, VHDL emulation chip 151 performs, as hardware, some or all functions described by one or more executions of some or all of the instructions found in CISWPL 148. That is, the VHDL emulation chip 151 is a hardware emulation of some or all of the software instructions found in CISWPL 148. In one embodiment, VHDL emulation chip 151 is a Programmable Read Only Memory (PROM) that, once burned in accordance with instructions from CISWPL 148 and VHDL program 139, is permanently transformed into a new circuitry that performs the functions of executed software instructions found in CISWPL 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2A:
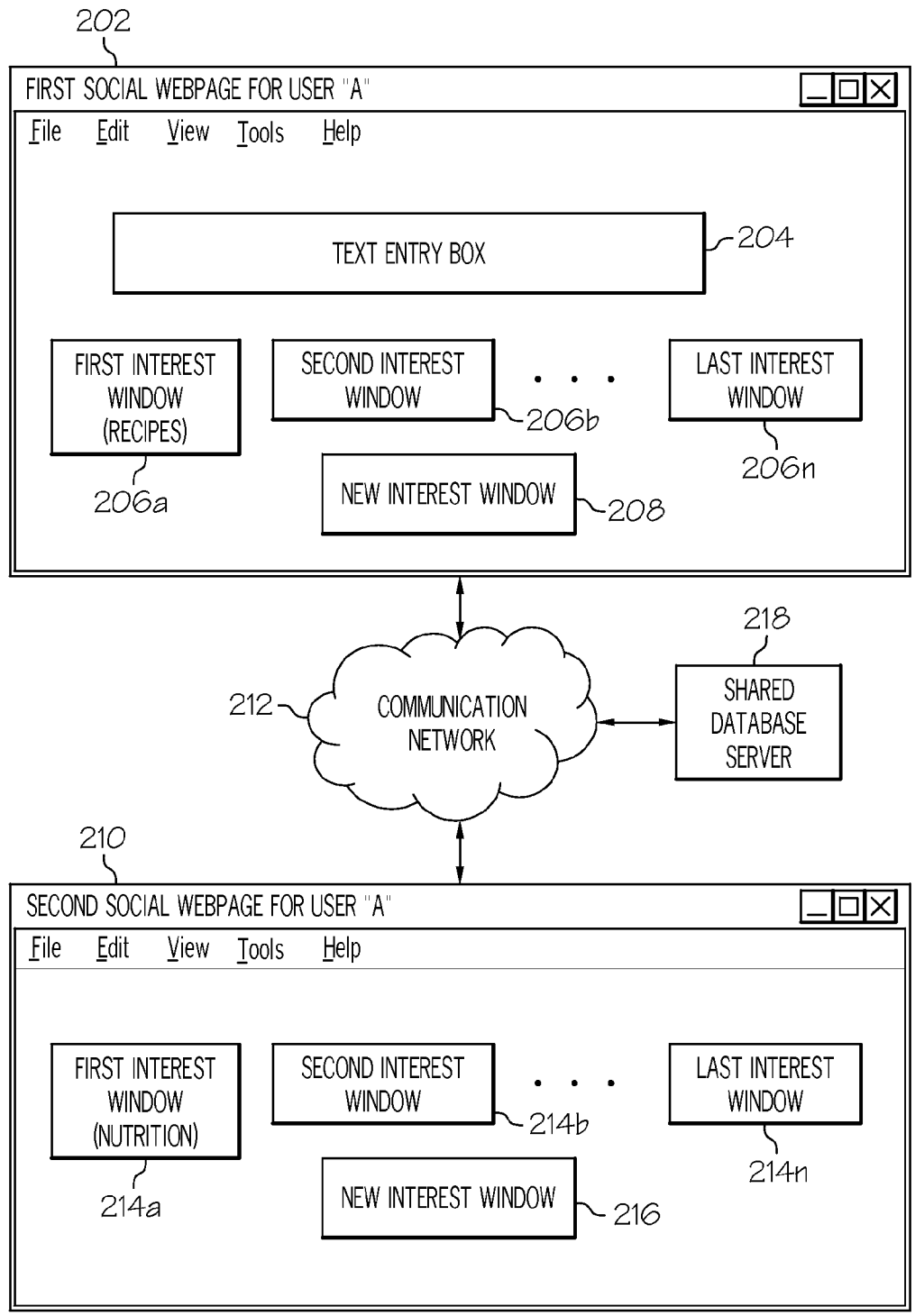
FIG. 2A illustrates a first social webpage on a first social network and a second social webpage from a second social network.

With reference now to FIG. 2a, a first social webpage 202 (which is part of a first social network 155 shown in FIG. 1) is coupled to a second social webpage 210 (which is a part of a second social network 153 shown in FIG. 1) via a communication network 212 (e.g., communication network 157 shown in FIG. 1). Note that, although on different social networks, the first and second social webpages 202 and 210 are used by a same user. For example, first social webpage 202 may be the user's social website on a first social network such as FACEBOOK® (FACEBOOK is a registered trademark of Facebook, Inc. in the United States and/or other countries), while the second social webpage 210 is on a second social network such as MYSPACE® (MYSPACE is a registered trademark of MySpace, Inc. in the United States and/or other countries). As will be described below, these two social networks, without the present invention, do not share a common database nor can their social webpages communicate with one another. Furthermore, the format of the two webpages/networks is different, such that a first interest window 206a on the first social webpage 202 is likely to be different (appearance, name, format, etc.) from the first interest window 214a in the second social webpage 210, even though the first interest window 206a and the first interest window 214a may be devoted to a same subject topic.

On the first social webpage 202 is a text entry box 204. The user is able to enter text data into this text entry box 204, and the entered text can then be analyzed and categorized into a particular subject by logic found in CISWPL 148 shown in FIG. 1. First social webpage 202 also includes multiple interest windows 206a-n, where "n" is an integer, and where each interest window is for a different subject topic. For example, assume that first interest window 206a is a section of the first social webpage 202 that is devoted to the subject of "cooking." Similarly, first interest window 214a (from interest windows 214a-n) from second social webpage 210 is also devoted to the subject of "cooking." However, first interest window 206a and first interest window 214a may actually appear on their respective social webpages under different names and/or have different labels, metadata tags, etc. For example, first interest window 206a may be titled "RECIPES" while first interest window 214a may be titled "NUTRITION" when displayed on their respective webpages.

Figure 2B:
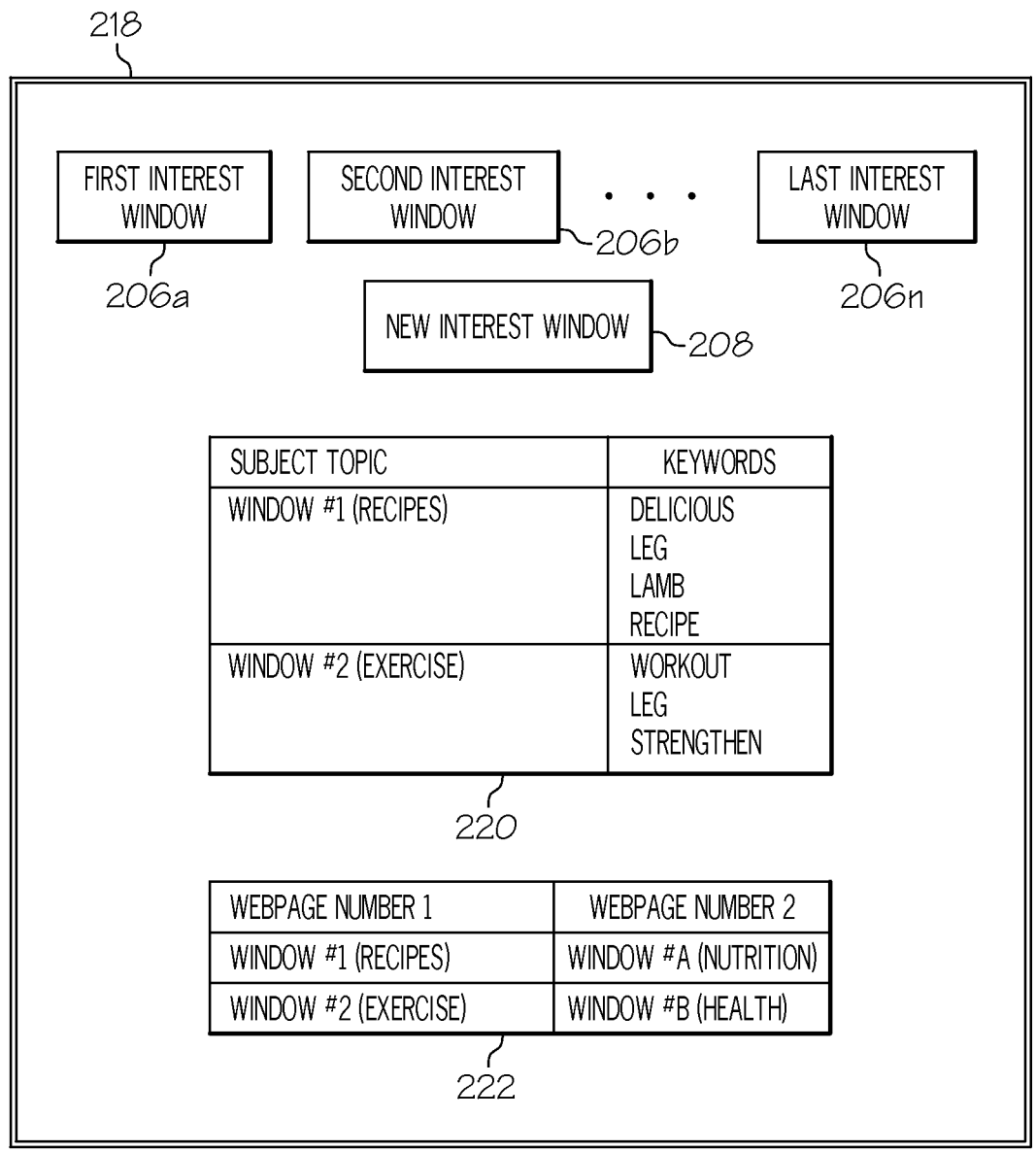
FIG. 2B depicts additional detail of contents of a shared database server that is accessible to both social webpages shown in FIG. 2A.

Once a user enters text data in the text entry box 204, that entered data is analyzed and categorized into a particular subject topic. For example, assume that the user entered "Here is a new recipe that I have discovered for leg of lamb." Lookup tables and logic for determining the subject topic for this entry may be within a local computer (e.g., computer 102 shown in FIG. 1) that is hosting the first social webpage 202, a first social network server 152 (also shown in FIG. 1), or in a shared database server 218 shown in FIG. 2. Assume for purposes of explanation that the lookup table is found in the shared database server 218, and is shown in FIG. 2b as lookup table 220. Note that the term "leg" appears as a keyword for both RECIPES as well as EXERCISE. However, since at least one other keyword for RECIPES is found in the entered text passage (LAMB and RECIPE), then subject topic determination logic (e.g., CISWPL 148 shown in FIG. 1) is able to conclude that this is a recipe, and thus should be sent to the first interest window 206a. Note also that the shared database server 218 may have a copy of the interest windows 206a-n from the first social webpage 202, thus making an updated copy of the interest windows 206a-n that can be shared with the second social webpage 210.

If subject topic determination logic is unable to determine what the subject of the entered text is, then a new interest window 208 is created within the first social webpage 202 (with a copy of the new interest window 208 optionally being sent to the shared database server 218) and/or second social webpage 210. If the subject topic determination logic is able to determine a name and topic for the new interest window 208, then that new interest window 208 is so named. Otherwise, the user is prompted to examine the entered data that now populates the new interest window 208, and that user then enters an appropriate name for new interest window 208.

As shown in FIG. 2a, first social webpage 202 and second social webpage 210 are linked by a communication network 212. As such, data from the text entry box 204 can be sent peer-to-peer to the appropriate interest window in the second social webpage 210. Similarly, the newly created new interest window 208 can be sent peer-to-peer to the second social webpage 210, where it is displayed as new interest window 216. Alternatively, the entered text from the text entry box 204 and/or the new interest window 208 may be stored in the shared database server 218 (shown in additional detail in FIG. 2b), thus allowing the second social webpage to pull this data/window from the shared database server 218.

Note that besides being from different social networks, first social webpage 202 and second social webpage 210 may be listed under slightly different names. For example, first social webpage 202 may be registered to "John Smith" while second social webpage 210 is registered to "John A. Smith." In order to correlate these two names/webpages, "fuzzy logic" (part of CISWPL 148 shown in FIG. 1) may be used to correlate any webpages that are assigned to persons having substantially similar names (e.g., 95% of the name characters match). In a preferred embodiment, however, a lookup table (also part of CISWPL 148 shown in FIG. 1) is utilized to ensure that information is "pushed onto" (in the manner described herein) ONLY second webpages that are for a same person who has the first webpage. This lookup table will list all authorized social webpages that 1) belong to the same owner as the first social webpage, and 2) are authorized to receive "pushed" information from the first social webpage. Thus, in one embodiment, any authorization to create, read, update and/or delete information from the first social webpage 202 and/or the second social webpage 210 is declared (e.g., through the use of a flag) in this (or another) lookup table, such that the lookup table must be consulted before "pushing" information from the first social webpage 202 onto the second social webpage 210.

Note also in FIG. 2b that a second lookup table 222 is provided for correlating interest window names between the first and second social webpages. For example, the first social webpage may use the metadata and/or title of RECIPES to describe information about cooking, while the second social webpage uses the metadata and/or title of NUTRITION for such information. Lookup table 222 allows entered data that has been intelligently categorized under RECIPES in the first social webpage 202 to be populated in the corresponding NUTRITION interest window in the second social webpage 210.

Note that while the invention is described as text being entered into the text entry box 204, thus leading to a classification of that text for population into an appropriate interest window, in an alternate embodiment, a graphic file (e.g., a Tagged Image File Format (TIFF) or Joint Photograph Experts Group (JPEG) file), an audio file (e.g., an MP3 audio file), or a multimedia combination of audio and video files may be analyzed by header information, metadata, etc. in order to move such a file from an input window into the appropriate interest window on the webpage.

Figure 3:
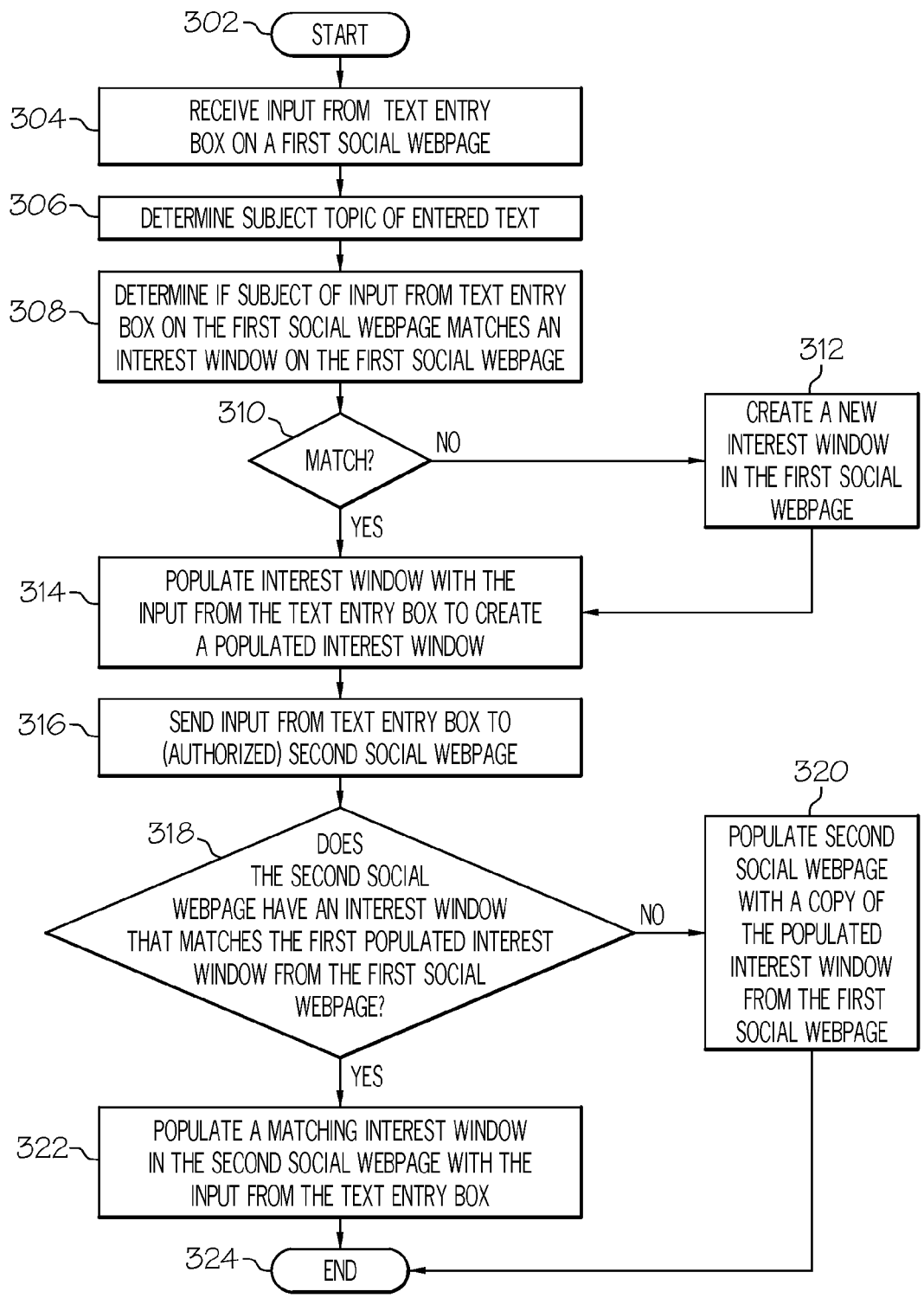
FIG. 3 is a high-level flowchart of exemplary steps taken to classify and share data that is entered into the first social webpage shown in FIG. 2A.

Referring now to FIG. 3, a high-level flow chart of exemplary steps taken to receive and categorize data for population of local and remote interest windows in different webpages for a same user is presented. After initiator block 302, text input is received from a text entry box on a first webpage that is on a first social network (block 304). As described in block 306, the subject topic of the text input is then determined. This determination is made using any contextual analytical device, including, but not limited to, the keyword matching protocol described above. A determination is then made to decide if any of the interest windows (i.e., windows, boxes, etc. on the user's social webpage that are devoted to a particular subject) are devoted to the same subject matter as that determined for the entered text (block 308). If such a match exists (query block 310), then the appropriate interest window (that matches the same subject matter topic as was determined for the entered text from the text entry box) on the first social webpage is populated with the text entry (block 314). If no such interest window exists on the first social webpage (query block 310), then a new interest window that is devoted to the determined subject topic is created and populated with the entered text from the text entry box on the first social webpage (block 312).

As described in block 316, a copy of the data that was entered in the text entry box is then sent to a second social webpage that is part of another social network (e.g., the data is sent from a MYSPACE® social webpage to a FACEBOOK® social webpage, where both social webpages are for a same person/entity). This data may be sent peer-to-peer directly from one webpage to another, or is may be sent to an intermediary device (e.g., shared database server 218 shown in FIG. 2a), which then shares the information with the second webpage. This sharing or information may be in response to a request from the second webpage, or it may be "pushed" onto the second webpage by the intermediary server and/or the first webpage. In either scenario, if the second webpage does not have an interest window whose subject matter matches that of the newly entered data from the first webpage (query block 318), then a new interest window is created in the second webpage and populated with this data as part of a copy of all of the appropriate interest windows from the first webpage (block 320). Otherwise, a matching interest window is merely updated by being populated with the newly entered data (block 322). The process ends at terminator block 324.

Returning to block 316, note that the input from the text entry box may be sent to the second social webpage only if the second social webpage is so authorized. For example, assume that the input and/or first interest window 206a are only to be shared with other users on the first social network, but not those on the second social network. In that scenario, then the new input and/or first interest window 206a may not be shared with users on the second social network, and thus should not update/populate the user's webpage on the second social network. Of course, if users on a third social network are authorized to view/share this content, then the new input and first interest window 206a can be shared with these third social network users via a third social webpage that also belongs to the owner of the first social webpage.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), and writable storage media (e.g., hard disk drive, read/write CD ROM, optical media). It should be understood, therefore, that such storage media when encoded with computer readable instructions that direct method functions in the present invention, represent alternative embodiments of the present invention. Further, it is understood that the present invention may be implemented by a system having means in the form of hardware, software, or a combination of software and hardware as described herein or their equivalent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing an additional physical transformation of the computer system.

Note that while the present invention has been described in one embodiment as being utilized within the context of social webpages and social networks, the concepts and teachings presented herein are also useful when utilized within the context of any webpage and/or network.

Having thus described the invention of the present application in detail and by reference to illustrative embodiments thereof, it will be apparent that modifications and variations are possible without departing from the scope of the invention defined in the appended claims.

What is claimed is:

1. A computer-implemented method of managing data in a webpage, the computer-implemented method comprising:
   configuring a specific processor with computer-executable instructions, that when executed, perform the steps of:
   receiving an input of entered data from a text entry box on a first webpage that is on a first network;
   determining a subject topic of the entered data;
   matching the subject topic with a matching interest window on the first webpage, wherein the matching interest window is reserved for data entries that are described by the subject topic;
   in response to the subject topic for the entered data matching the matching interest window, populating the matching interest window with the entered data that matches the subject topic of the interest window to create an updated interest window; and
   in response to a processor being unable to determine the subject topic of the entered data in the text entry box, the processor creating a new interest window in the first webpage.

2. The computer-implemented method of claim 1, wherein the first network is a first social network, and wherein the computer-implemented method further comprises:
   migrating a copy of the updated interest window to a second webpage that is on a second social network, wherein the first webpage and the second webpage are social webpages for a same person.

3. The computer-implemented method of claim 2, wherein the copy of the updated interest window is migrated from the first webpage to the second webpage via a peer-to-peer move.

4. The computer-implemented method of claim 2, wherein the copy of the updated interest window is migrated from the first webpage to the second webpage via a shared database server.

5. The computer-implemented method of claim 1, further comprising:
   matching the subject topic to a second interest window on a second webpage that is on a second social network; and
   updating the second interest window with the entered data from the first webpage.

6. The computer-implemented method of claim 5, wherein the second interest window is updated with the entered data from the first webpage via a peer-to-peer move.

7. The computer-implemented method of claim 5, wherein the second interest window is updated with the entered data from the first webpage via a shared database server.

8. The computer-implemented method of claim 5, wherein the first interest window and the second interest window have different titles, and wherein the computer-implemented method further comprises:
   mapping the first interest window to the second interest window.

9. The computer-implemented method of claim 1, wherein the subject topic of the entered data is determined by matching at least two words from the entered data to entries from a list of keywords that describe the subject topic.

10. A non-transitory computer-readable storage device on which is encoded a computer program, the computer-readable storage device comprising:

first program instructions for receiving an input of entered data from a text entry box on a first webpage that is on a first network;

second program instructions for determining a subject topic of the entered data;

third program instructions for matching the subject topic with an interest window on the first webpage, wherein the interest window is reserved for entries that are described by the subject topic;

fourth program instructions for populating the interest window with the entered data that matches the subject topic of the interest window to create a populated interest window; and fifth program instructions for, in response to a processor being unable to determine the subject topic of the entered data in the text entry box, creating a new interest window in the first webpage; and wherein the first, second, third, fourth, and fifth program instructions are stored on said non-transitory computer-readable storage device.

11. The non-transitory computer-readable storage device of claim 10, wherein the first network is a first social network, and wherein the computer-readable storage device further comprises:

sixth program instructions for migrating a copy of the populated interest window to a second webpage that is on a second social network; and wherein said sixth program instructions are stored on said non-transitory computer-readable storage device.

12. The non-transitory computer-readable storage device of claim 10, further comprising:

sixth program instructions for matching the subject topic to a second interest window on a second webpage that is on a second social network; and seventh program instructions for populating the second interest window with the entered data from the first webpage; and wherein said sixth and seventh program instructions are stored on said non-transitory computer-readable storage device.

13. The non-transitory computer-readable storage device of claim 10, further comprising:

sixth program instructions for, in response to determining that the first webpage has no interest window that matches the subject topic, creating a new interest window in the first webpage that matches the subject topic; and wherein said sixth program instructions are stored on said non-transitory computer-readable storage device.

14. The non-transitory computer-readable storage device of claim 10, wherein the subject topic of the entered data is determined by matching at least two words from the entered data to entries from a list of keywords that describe the subject topic.

15. A system comprising:

a processor, a computer readable memory, and a computer readable storage media;

first program instructions for receiving an input of entered data from a text entry box on a first webpage that is on a first social network;

second program instructions for determining a subject topic of the entered data;

third program instructions for matching the subject topic with an interest window on the first webpage, wherein the interest window is reserved for entries that are described by the subject topic;

fourth program instructions for populating the interest window with the entered data that matches the subject topic of the interest window to create a populated interest window; and fifth program instructions for, in response to a processor being unable to determine the subject topic of the entered data in the text entry box, creating a new interest window in the first webpage; and wherein said first, second, third, fourth, and fifth program instructions are stored on said computer readable storage media for execution by said processor via said computer readable memory.

16. The system of claim 15, further comprising:

sixth program instructions for migrating a copy of the populated interest window to a second webpage that is on a second social network, wherein said sixth program instructions are stored on said computer readable storage media for execution by said processor via said computer readable memory.

17. The system of claim 15, further comprising:

sixth program instructions for matching the subject topic to a second interest window on a second webpage that is on a second social network; and seventh program instructions for populating the second interest window with the entered data from the first webpage, and wherein said sixth and seventh program instructions are stored on said computer readable storage media for execution by said processor via said computer readable memory.

18. The system of claim 15, further comprising:

sixth program instructions for, in response to determining that the first webpage has no interest window that matches the subject topic, creating a new interest window in the first webpage that matches the subject topic, wherein said sixth program instructions are stored on said computer readable storage media for execution by said processor via said computer readable memory.

19. The system of claim 15, wherein the subject topic of the entered data is determined by matching at least two words from the entered data to entries from a list of keywords that describe the subject topic.

* * * * *